No. 705,402. Patented July 22, 1902.
W. C. HOLLOWAY.
MOTOR CAR.
(Application filed Apr. 18, 1902.)
(No Model.) 2 Sheets—Sheet 1.
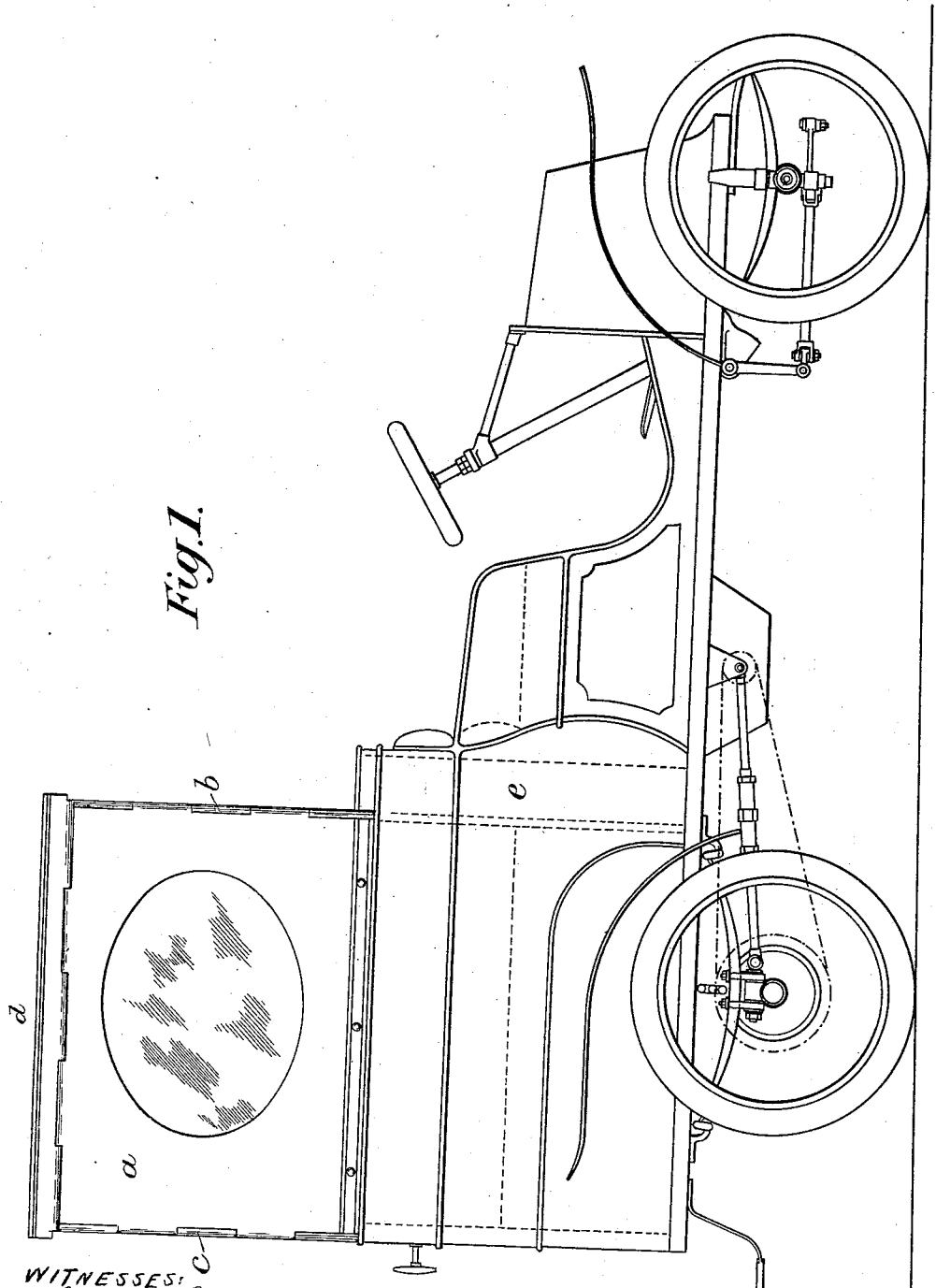
WITNESSES:
F. W. Wright.
S. C. Cornick
INVENTOR
WILLIAM CLAUDE HOLLOWAY
BY
Howson and Howson
HIS ATTORNEYS.

No. 705,402. Patented July 22, 1902.
W. C. HOLLOWAY.
MOTOR CAR.
(Application filed Apr. 18, 1902.)
(No Model.) 2 Sheets—Sheet 2.
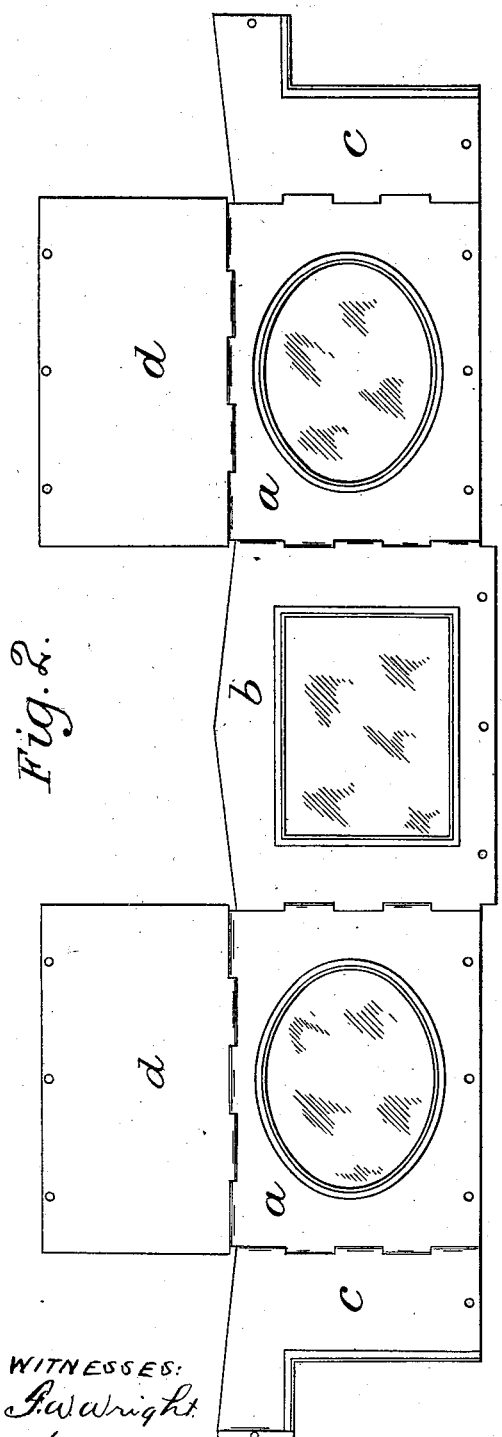
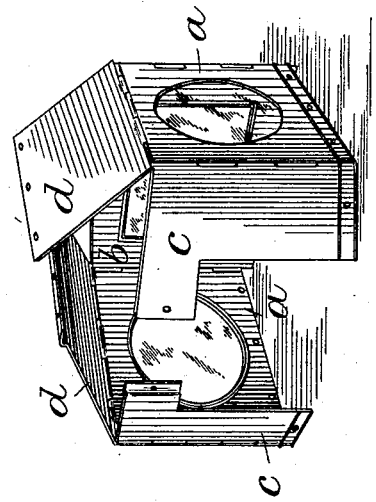
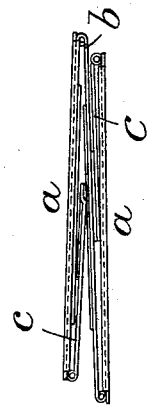
WITNESSES:
G. W. Wright
S. C. Connor
INVENTOR
WILLIAM CLAUDE HOLLOWAY
BY
Howson and Howson
HIS ATTORNEYS.

UNITED STATES PATENT OFFICE.

WILLIAM CLAUDE HOLLOWAY, OF WESTMINSTER, ENGLAND.

MOTOR-CAR.

SPECIFICATION forming part of Letters Patent No. 705,402, dated July 22, 1902.

Application filed April 18, 1902. Serial No. 103,605. (No model.)

*To all whom it may concern:*

Be it known that I, WILLIAM CLAUDE HOLLOWAY, engineer, a subject of the King of Great Britain and Ireland, residing at 15 Old Queen street, Queen Anne's Gate, in the city of Westminster, England, have invented certain new and useful Improvements in Motor-Cars and other Road-Vehicles; and I do hereby declare the following to be a full, clear, and exact description of the invention, such as will enable others skilled in the art to which it appertains to make and use the same.

My invention has for its object to provide a motor-car or other road-vehicle which can be readily converted from an open vehicle into a closed vehicle, (of the character, for example, of a brougham,) and vice versa, the parts being arranged so that when the vehicle is in use as an open vehicle the parts which make it a closed vehicle are contained within or carried by the vehicle, but out of the way and, if desired, entirely out of sight, but are capable of being brought into position to make the vehicle a closed vehicle with great ease and expedition.

According to my invention the sides and front and back parts, which constitute the upper parts of the vehicle when it is used as a closed vehicle, are made so that they can be elevated and lowered, and they are accommodated when lowered in a recess or recesses or a space or spaces inside or outside the lower or body part of the vehicle, and when raised they are supported above the said lower or body part. Parts to form the roof are hinged or equivalently connected to the sides or front and back parts, which constitute the upper portion of the closed vehicle, so that the parts forming the roof can be folded onto the said sides or front and back parts and lowered with them when the vehicle is to be used as an open vehicle. The said upper parts may be received in a casing or casings at the sides and front and back of the lower portion of the vehicle or in recesses or spaces within the said sides and front and back, or the said upper side, front, and back parts may be hinged or connected together, so that they can be folded upon each other and then be lowered in a casing, recess, or space or casings, recesses, or spaces at the side or sides or at the front or back of the lower part or body of the vehicle. The said casings, recesses, or spaces may be provided with covers which close them when the upper parts have been lowered into them. The movable parts are provided with means for raising and lowering them—such, for example, as racks and pinions or other mechanical means or rings or other devices—to be grasped by the hand, and the parts of the roof are shaped so that they will fit closely together when in use, and an elastic material may be used to make a tight joint between them. The sides and back and front portions may be made separate from each other or be connected together, fastenings being used to connect the several upper parts when they are made separately, such fastenings being of any suitable kind—such, for example, as pivoted hooks on one part and studs on the other part, such as are used for securing the parts of the collapsible covers of landaus. By lifting the covers of the casing, recess, or space or casings, recesses, or spaces the upper parts can be raised and be supported in their raised position by any suitable device provided for the purpose and the parts of the roof be unfolded and secured together, when the vehicle will constitute a closed vehicle. By undoing the fastenings and folding the parts of the roof onto the sides or end and back of the upper part and by folding the sides and front and back portions together, if they be arranged to allow of this, they can all be lowered into the casing, recess, or space or casings, recesses, or spaces provided for them in the lower portion of the vehicle and the cover or covers be folded or placed over them, when the vehicle will have the appearance of an ordinary closed vehicle. The door may be provided with a window or panel, which can be raised to complete the inclosure of the upper part when the vehicle is used as a closed vehicle. The raisable front part may also have a part hinged to it to act as a protection for the driver, or for this purpose in front of the vehicle there may be parts arranged similarly to the parts hereinbefore described and capable of being similarly folded and raised and lowered.

The accompanying drawings represent an arrangement in accordance with my invention wherein the upper parts are hinged together, so that they can be folded together and dropped into a casing in front of the vehicle.

Figure 1 is a side elevation of the vehicle with the upper parts in position for use. Fig. 2 is a view of the upper parts folded out. Fig. 3 is a plan of them folded together, and Fig. 4 is a perspective view of the parts partially folded together. Figs. 2, 3, and 4 are drawn to a smaller scale than Fig. 1.

The upper side parts $a$ are hinged to the upper front part $b$, and the two portions $c$ of the upper back part are respectively hinged to the side parts $a$. The portions $d$, forming the roof, are hinged to the tops of the respective side portion $a$. When the parts are raised and connected together by fastenings and also secured by fastenings to the rim around the upper edge of the lower or body part of the car, the vehicle constitutes a closed vehicle, as shown in Fig. 1. When the fastenings are unfastened and the parts are folded together, as shown in Fig. 3, they can be dropped into the recess $e$, Fig. 1, in the front of the vehicle, which recess is preferably provided with a lid at top to close the said recess.

It will be readily understood that the invention is not limited to the precise arrangement illustrated. For example, the recess may extend along the sides and front of the lower part or body of the vehicle and the parts be folded so that they form three sides of a rectangle, which will then be dropped into the similar recess in the lower part or body of the vehicle, or the recesses may be made at each side of the lower part or body of the vehicle and the front upper part $b$ be made in two portions capable of being folded one against one side and the other against the other side, so that all the upper parts can be folded together in two sets and one of each inserted in the respective side recesses in the lower part or body.

Having now particularly described and ascertained the nature of the said invention and in what manner the same is to be performed, I declare that what I claim is—

1. A motor-car having a lower body part with a recess or recesses and an upper part which is composed of portions adapted to be folded flat upon each other, and as thus folded to be lowered into such recess or recesses, substantially as described.

2. A motor-car having a lower body part with a recess or recesses and an upper part consisting of roof and wall portions connected together and adapted to be folded flat upon each other and as thus folded to be lowered in such recess or recesses, substantially as described.

3. A motor-car having a lower body part with a recess or recesses and an upper part composed of a roof portion and wall portions provided with windows, said portions being adapted to be folded flat upon each other and as thus folded to be lowered into such recess or recesses, substantially as described.

In testimony whereof I affix my signature in presence of two witnesses.

WILLIAM CLAUDE HOLLOWAY.

Witnesses:
FRANCIS CLEMENTS HARPER,
WILLIAM JAMES COSTIN.